United States Patent

Gsell et al.

[11] Patent Number: 5,114,775
[45] Date of Patent: May 19, 1992

[54] GRIPPER ROD FOR SHUTTLELESS LOOMS AND METHOD FOR MAKING THE GRIPPER ROD

[75] Inventors: Rainer Gsell, Weissensberg, Fed. Rep. of Germany; Philip White, Chandler, Ariz.

[73] Assignee: Lindauer Dornier Gesellschaft m.b.H, Lindau, Fed. Rep. of Germany

[21] Appl. No.: 514,081

[22] Filed: Apr. 25, 1990

[30] Foreign Application Priority Data

Apr. 25, 1989 [DE] Fed. Rep. of Germany ....... 3913602

[51] Int. Cl.$^5$ .............................................. B32B 5/12
[52] U.S. Cl. .................... 428/107; 428/109; 428/110; 428/112; 428/113; 428/114; 428/182; 428/184; 428/186; 139/444; 139/445; 139/449
[58] Field of Search ............... 428/107, 109, 113, 182, 428/184, 110, 114, 112, 186; 139/444, 445, 449; 156/205, 210

[56] References Cited

U.S. PATENT DOCUMENTS

| | | | |
|---|---|---|---|
| 4,409,274 | 10/1983 | Chaplin | 156/210 |
| 4,622,254 | 11/1986 | Nishimura | 428/113 |
| 4,690,177 | 9/1987 | Gehring et al. | 139/449 |
| 4,726,863 | 2/1988 | Cline | 156/210 |
| 4,783,356 | 11/1988 | Kugelmann | 428/182 |
| 4,946,721 | 8/1990 | Kindervater | 428/182 |

FOREIGN PATENT DOCUMENTS 3527202 7/1985 Fed. Rep. of Germany.

*Primary Examiner*—Henry F. Epstein
*Assistant Examiner*—Nasser Ahmad
*Attorney, Agent, or Firm*—W. G. Fasse

[57] ABSTRACT

A gripper rod for shuttleless looms has a toothed rack made of fiber reinforced composite material. The prepregs are stacked in such a way that the fiber orientation in one layer crosses the fiber orientation of at least one neighboring layer. A sufficient number of layers are preferably stacked relative to a central plane of symmetry. The so prepared stack is then placed into a pressing die to form the toothed rack configuration. Due to the pressing, the initial fiber orientation changes so that the fibers after the pressing extend approximately in parallel to the surfaces of the toothed rack, especially the tooth flank forming surfaces and along the edges, whereby the strength of the toothed rack and the wear and tear resistance, especially of the tooth flanks is improved. The angular orientation of the fiber directions relative to a longitudinal edge of a prepreg may be within the range of about 15° to about 25° prior to the pressing and within a smaller range down to zero after the pressing.

20 Claims, 4 Drawing Sheets

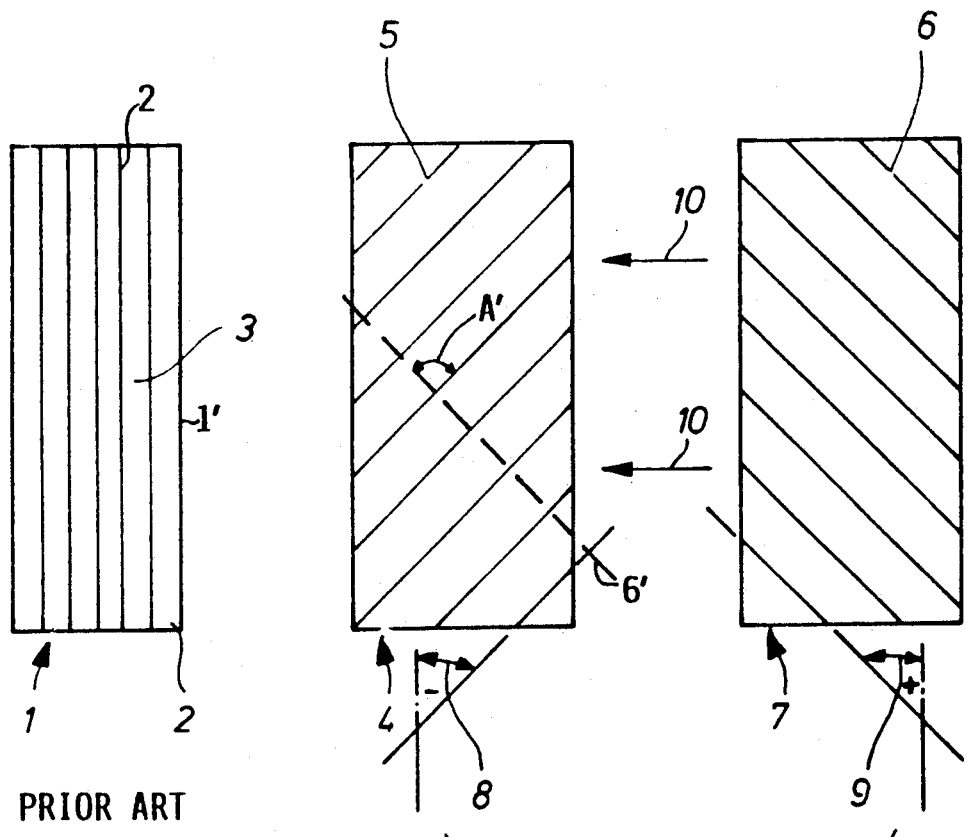
PRIOR ART
FIG 1
FIG 2
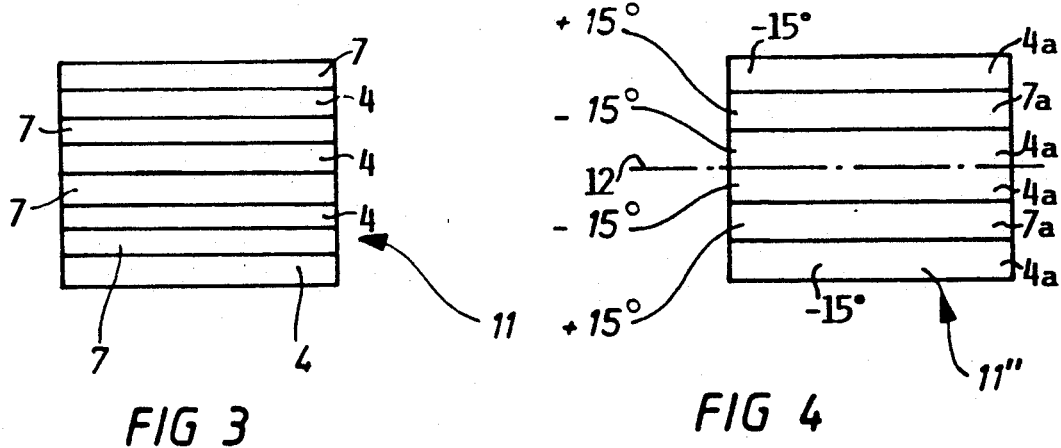
FIG 3
FIG 4

GRIPPER ROD FOR SHUTTLELESS LOOMS AND METHOD FOR MAKING THE GRIPPER ROD

FIELD OF THE INVENTION

The invention relates to a gripper rod for shuttleless looms and to a method for making such gripper rods. Such gripper rods may be made of fiber composite materials, so called prepregs, which are stacked to form a laminate structure which is then pressed and cured to form the toothed rack.

BACKGROUND INFORMATION

German Patent Publication (DE) No. 3,527,202, corresponding to U.S. Pat. No. 4,690,177, discloses a toothed rack made of fiber composite prepregs. In the known rack the individual prepregs are provided with cutouts that increase in size from the bottom up. In other words, the prepreg with the smallest holes is located on the bottom, while the prepreg with the largest holes forms an outer layer, so that the teeth of the toothed rack are formed between the gaps which are formed by the holes in the layered prepregs. This known construction results in a heavy rod since the holes in the prepregs not only form the teeth, they also form lateral walls resulting in extra weight.

Another drawback of the known construction is seen in the fact that the formation of the holes in the prepreg, for example, by stamping exposes fiber ends around the edges of the holes. These fibers ends may become the starting points for fraying during operation. Further, a step-like configuration is caused along the teeth flanks due to the layering of the prepregs with increasing holes therein. Excessive matrix material may accumulate on these steps, whereby the material strength is reduced in locations where it ought to be largest, namely, along the tooth flanks. To minimize this problem, U.S. Pat. No. 4,690,177 discloses the insertion of a wear resistant layer, for example, of Teflon ® into the gaps to cover the tooth flanks. The hole cutting and extra wear resistant layer make the known manufacturing method rather expensive. Further, the above mentioned weight contributes to an increased wear and tear due to the required mass acceleration that must be applied to the gripper rod for each weft thread insertion movement. Accordingly, there is room for improvement.

OBJECTS OF THE INVENTION

In view of the above it is the aim of the invention to achieve the following objects singly or in combination:

to construct a gripper rod of the type described above in such a manner that the manufacturing costs are reduced and a lighter weight, as well as an improved wear and tear resistance, arc achieved;

to substantially avoid the exposure of fiber ends, especially along the tooth flanks;

to provide hollow spaces in the gripper rod, or rather in the toothed rack portion of the gripper rod to reduce the overall weight of the gripper rod;

to arrange the fibers in the individual prepreg layers in such a way that the fiber displacement caused by the compression of the assembled stack of unperforated prepregs will avoid the exposing of fiber ends, especially in areas of the toothed rack which are exposed to wear and tear;

to that the individual fibers will run substantially in parallel to the length of the surface of the finished toothed rack, especially in surface area sections that are most exposed to wear and tear, such as the tooth flanks; and to avoid stretching the individual fibers in the prepregs when the stack of prepregs is compressed in a die to form the teeth in the toothed rack and to permit the individual fibers to assume a different angular orientation in response to the compression applied by the die, so that the fibers merely assume a reoriented position without actually being stretched.

SUMMARY OF THE INVENTION

The toothed rack end of a gripper rod according to the invention comprises a plurality of stacked fiber composite layers or so-called prepregs with a special fiber orientation of the fibers in each layer with reference to the fiber orientation of at least one neighboring fiber composite layer in a stack prior to any deforming of the stack in a die. The fiber orientation is such that the fibers in one layer cross the fiber direction in a neighboring layer with a given crossing angle at least prior to compressing the stack into the toothed rack shape in said die having the required toothed rack configuration, and so that the fibers in one layer extend in a direction other than the fibers in at least one neighboring layer. Preferably, the fiber crossings remain with a more acute crossing angle even after the compressing step for an improved wear and tear resistance. The individual prepreg layers according to the invention, used to form the stack, do not have any punched holes therein. Preferably, the fibers in each composite fiber layer are uninterrupted along the length of the corrugated fiber composite layer at least where tooth flanks are formed by the corrugations. In another embodiment, the fibers are relatively short, for example, 30 to 40 mm, and extend in parallel to each other in a lengthwise direction, but with overlaps in a crosswise direction. In both embodiments it is preferable that at least the tooth flanks of the gripper rod are substantially without exposed fiber ends.

Due to the corrugated configuration of the toothed portion of the present gripper rod, there are hollow spaces in the toothed portion. These hollow spaces substantially reduce the weight of the present rods, for example 30% to 40%, as compared to the weight of solid rods. Further, since the prepreg layers or tapes do not have any perforations therein, there are no fiber ends exposed on the tooth flanks, whereby the wear resistance and strength of the present rods are substantially increased compared to conventional rods. Such strength increase is also improved by the fact that the fibers extend substantially uninterrupted along the length of the corrugated stack forming the teeth in the toothed rack or that they at least overlap each other in a crosswise direction.

The present gripper rod is formed by the following steps. First, a plurality of fiber composite prepreg layers having reinforcing fibers embedded in a matrix material are prepared so that the individual fibers in one layer extend at an angle relative to a fiber direction in a directly neighboring layer of a set of layers. The so-prepared layers of a set are then stacked so that the fibers in any layer of the resulting stack cross the fiber direction in at least one directly neighboring layer in the stack prior to any compression. The formed stack is then inserted into a die having an upper tool and a lower tool each provided with a toothed rack configuration arranged so that teeth in one tool face gaps in the other tool. The tools are then pressed against each other so that the stack is compressed between the tools, whereby the stack assumes a corrugated configuration of a toothed rack. The so deformed stack is then cured whereby the cured matrix material bonds the layers to each other in the corrugated configuration. The cured stack is removed from the die and secured to a support and reinforcing member, such as a flat stiffening bar or a rail member having a U-channel cross-section. The attachment of the toothed rack to the reinforcing member could be accomplished by a glue or by welding or by a press-fit.

The gist of the invention is seen in that steps are taken to avoid a lengthening or stretching of the individual fibers by the forming step in which a stack of prepreg layers is pressed in the die. It has been found that stretching the reinforcing fibers in the fiber composite material forming the prepregs is undesirable because stretched fibers appear to adversely affect the strength and wear and tear characteristics of the finished gripper rod. In order to avoid such stretching, the invention prepares the individual prepreg layers in such a way that initially, namely prior to the pressing step, the fibers in one layer cross the fiber direction in at least one immediately neighboring layer in such a way that during the subsequent pressing and heat treatment operation the fibers can assume another fiber orientation without being stretched. This is possible because by changing the crossing angle between the fibers, especially by making the crossing angle smaller, the fibers can assume an orientation, in response to the pressing and heating operation, which places the fibers approximately in parallel to a longitudinal edge of the gripper rod. This approximate parallel orientation is intended to refer to the fiber orientation even if the fibers have assumed a corrugated configuration after the pressing. This orientation of the fibers even after the pressing and heating operation is advantageous for the mechanical characteristics of the gripper rod since it improves the mechanical strength as well as the wear and tear, especially along the tooth flanks of the toothed rack forming part of the gripper rod.

The improved strength is believed to be due to the unstretched orientation of the fibers, not only relative to the longitudinal edge of the rod, but also parallel to the surfaces of the rod, especially along the tooth flanks. Another advantage is seen in that shrinking is reduced to an extraordinarily small shrinkage during the curing. Thus, the tooth profile substantially retains its configuration during the curing.

It has been found that crossing angles in the range of 15° to about 25° prior to the pressing, are suitable for the present purposes. Such angular ranges may permit a certain fiber crossing even after the deformation in the die. In an advantageous embodiment, the stack of fiber composite layers is formed with reference to a central symmetrical plane so that the structure of the stack resembles a mirror-symmetrical arrangement of the individual layers relative to said central plane of symmetry. A single stack may be inserted into a profiling die and pressed so that the resulting corrugated rack is formed with laterally open sides. Even if the laterally open rack is combined with a reinforcing member such as a flat stiff bar or a channel member as mentioned above, a substantial weight reduction is still achieved because hollow spaces remain in the toothed rack.

Instead of using fibers unconnected with each other, the individual prepreg layers may be formed by using fiber fabrics, including weft and warp threads or even knitted fabrics having a three-dimensional fiber construction in which fiber ribs extend in given directions.

BRIEF DESCRIPTION OF THE DRAWINGS

In order that the invention may be clearly understood, it will now be described, by way of example, with reference to the accompanying drawings, wherein:

FIG. 1 shows schematically a conventional fiber composite prepreg layer with a parallel fiber orientation;

FIG. 2 illustrates two prepregs in which the fiber orientation in one prepreg is opposite to the fiber orientation in the other prepreg;

FIG. 3 illustrates one way of stacking the prepregs of FIG. 2;

FIG. 4 illustrates another way of stacking the individual prepregs of FIG. 2;

Figure 5:
FIG. 5 is a plan view of a finished stack of prepregs that is ready for cutting prior to insertion into a forming die.

DETAILED DESCRIPTION OF PREFERRED EXAMPLE EMBODIMENTS AND OF THE BEST MODE OF THE INVENTION

FIG. 1 shows a prepreg layer 1 comprising reinforcing fibers 2 embedded in a matrix material 3. The fibers extend in parallel to each other and in parallel to a longitudinal edge 1' of the prepreg layer. Such layers are conventionally available and their matrix material 3 is still uncured prior to their final use. Curing normally takes place as part of the final use. In order to obtain a prepreg in which the fibers do not extend in parallel to the original longitudinal edge, it is possible to cut the prepreg to form new edges with reference to which the fibers extend at an angle, as will be explained in more detail below with reference to FIG. 2.

The fibers of the prepreg shown in FIG. 1 may, for example, be carbon fibers, glass fibers, polyamide fibers, or the like, embedded in a thermoplastic synthetic resin material suitable for the present purposes.

Referring to FIG. 2, a first prepreg 4 has a fiber orientation 5 in which the individual fibers extend at an angle 8 relative to the longitudinal edge of the prepreg 4. The fiber orientation 5 is considered to be negative since the fibers slant downwardly from the right longitudinal edge of the prepreg to the left edge. Similarly, the prepreg 7 has a fiber orientation 6 extending at an angle 9 relative to the longitudinal edge of the prepreg 7. The fiber orientation 6 is considered to be positive since the fibers slant upwardly from the right-hand edge. According to the invention, for example, the prepreg layer 7 is stacked onto the prepreg layer 4 by moving the layer 7 in the direction of the arrows 10 as shown in FIG. 2. A dashed line 6' in the prepreg layer 4 indicates the direction of the fiber orientation 6 relative to the fiber orientation 5 after the stacking of the layer 7 onto the layer 4, thereby forming a crossing angle A. The angles 8, 9, and the crossing angle A may be within the range of 0° to 90°. However, an angular range of 15° to 25° is preferred, because it has been found that especially advantageous results regarding the strength of the gripper rod and its resistance to wear and tear are achieved if the angles are selected to be within the narrower range of 15° to 25° or −15° to −25°.

In order to obtain a stack 11 of prepregs as shown in FIG. 3, or at 11' in FIG. 4, that will yield the required wall thickness for the toothed rack to be formed according to the invention, a plurality of prepregs will be stacked. For example, for a wall thickness of 1.1 mm of the toothed rack, about ten to fifteen prepregs 4, 7 will be stacked. The stacking will be performed so that a symmetric arrangement of the fiber orientation or rather of the angular orientation of the fibers in the finished stack will be achieved. One type of symmetric arrangement will be accomplished if two different fiber orientation as shown in FIG. 2, will alternate with each other throughout a formed stack. Such an orientation of the individual prepreg layers in the stack 11 is shown in FIG. 3.

FIG. 4 illustrates another symmetric arrangement of the fiber orientation in a stack 11' having a central plane of symmetry 12. This plane of symmetry 12 forms the interface between two prepregs 4a bonded to each other at the interface and having the same fiber orientation, for example −15° for the angle 8. The next two layers 7a away from the plane of symmetry 12 are, for example, of the type shown at 7 in FIG. 2 with a positive angle 9 of 15° and arranged to cross the fibers in the respective neighboring layer 4a. The next pair of layers comprises two layers 4a which again have a −15° fiber orientation. This type of arrangement also makes sure, just as in FIG. 3, that the fibers in any layer extend in a direction that crosses the fiber direction in at least one directly neighboring layer at a crossing angle as just described. The type of stacking illustrated in FIG. 4 results in a mirror-symmetrical arrangement of the individual prepreg layers relative to the central plane of symmetry 12.

A mirror-symmetrical arrangement can also be achieved by arranging a single layer with a given fiber orientation, for example, of +15° in the plane of symmetry 12 and making sure that both neighboring layers next to the layer in the plane of symmetry, have an opposite fiber orientation, for example −15°. In any event, the layering will start with the bottom layer and the symmetry is achieved by proceeding as described above toward the plane of symmetry and then away from the plane 12.

It is not necessary for the purposes of the invention that the angles which determine the fiber orientation are the same in each prepreg layer. For example, the angular value may increase or decrease symmetrically relative to the plane of symmetry 12, whereby, for example, angles of 15°, 30°, and 45° may be combined with one another, and these angles may have either a positive and/or negative slant as described above.

The so formed stack may be cured in a die as will be described below, or a preliminary curing may take place while the stack is still undeformed. If the curing or a preliminary curing takes place prior to the deformation, the stack is subjected to pressure and heat for the curing in accordance with instructions provided by the manufacturer of the prepregs. Where a preliminary curing is employed, the matrix material will be a thermoplastic material that will melt again when exposed to temperature and/or pressure, and which will solidify again. The just mentioned preliminary curing and consolidation of the stack can take place in a pressing tool or in an autoclave or in a vacuum oven under pressure.

FIG. 5 illustrates a top plan view of a precured plate 13 formed from a stack 11 or 11'. Initially, the plate 13 has an excess width which is trimmed down along dashed lines 14 leaving still a certain margin 16 in excess of the final width 15 corresponding to the finished width of the toothed rack 21 shown, for example, in FIG. 7. The excess margin 16 is left so that a precise width may be accomplished by a final sawing or grinding operation.

Figure 6:
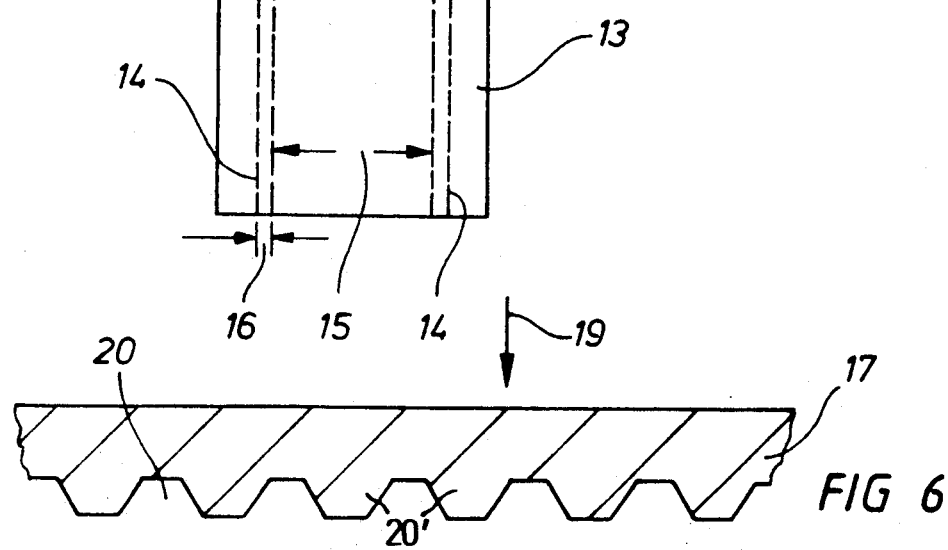
FIG. 6 illustrates a forming die that is used according to the invention.
Figure 7:
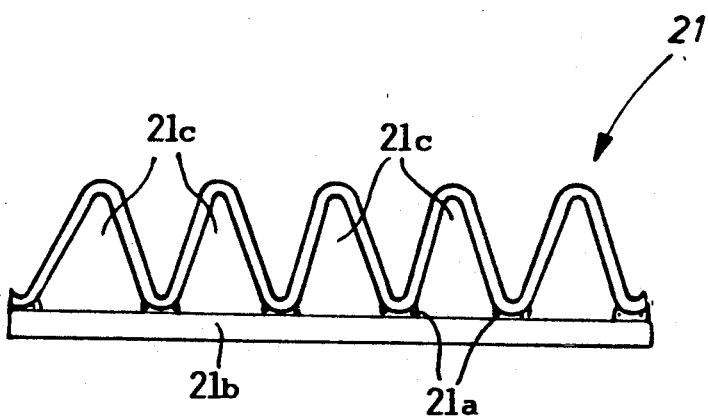
FIG. 7 illustrates a side view of a toothed rack according to the invention reinforced with a flat stiff bar for increased torsion stiffness.

FIG. 6 shows a die that is used according to the invention to form the toothed rack 21 shown in FIG. 7. The die comprises an upper tool 17 and a lower tool 18 each having spaces 20 between teeth 20'. The teeth 20' of one tool fit into the spaces 20 of the other tool and vice versa. The plate 13 shown in FIG. 5 is inserted between the tools 17 and 18 which are then moved toward each other as indicated by the arrow 19 to apply pressure to the plate 13 so that it may assume the corrugated configuration which will form the toothed rack 21. The teeth 20 will have a desired configuration, for example, to achieve a desired involute gearing. FIG. 7 is not a precise rendition in this respect because other types of gear forms can be used, as desired.

The dimensions of the teeth and spaces of the tools 17 and 18 will be so selected that any shrinking of the plate 13 is taken into account. Thus, the tooth pitch of the tools 17 and 18 will be larger than the tooth pitch of the final toothed rack forming part of the present gripper rod. Additionally, the spaces 20 and teeth 20' will be shaped in their geometry with regard, for example, to the radius and depth and so forth to also take into account an shrinking which is known for the type of prepreg material used.

If the plate 13 is of thermoplastic material, the tools 17 and 18 will be heated to a temperature to sufficiently plastify the plate 13 again for a smooth forming of the corrugated shape. The plate 13 may even be heated to a temperature above the melting point of the thermoplastic matrix material, so that upon closing of the die the thermoplastic material will be deformed to assume precisely the configuration imposed by the tools 17, 18. A repeated curing will then take place at least partially in the die which may be cooled for this purpose to achieve the desired toothed rack configuration.

FIG. 7 shows an embodiment of a toothed rack according to the invention in which the corrugated shape 21 is secured, for example, by adhesive bonding 21a to a reinforcing member 21b in the form of a flat rigid plate that imparts to the combined structure, a required torque resistance. The plate in combination with the corrugated shape 21 still has a light weight because the spaces 21c remain hollow.

Figure 8:
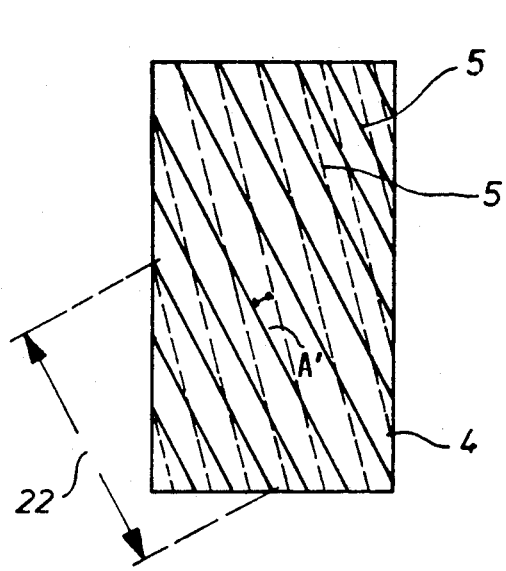
FIG. 8 illustrates with full lines the fiber orientation in a prepreg layer prior to the deformation and with dashed lines the fiber orientation after the deformation.
Figure 9:
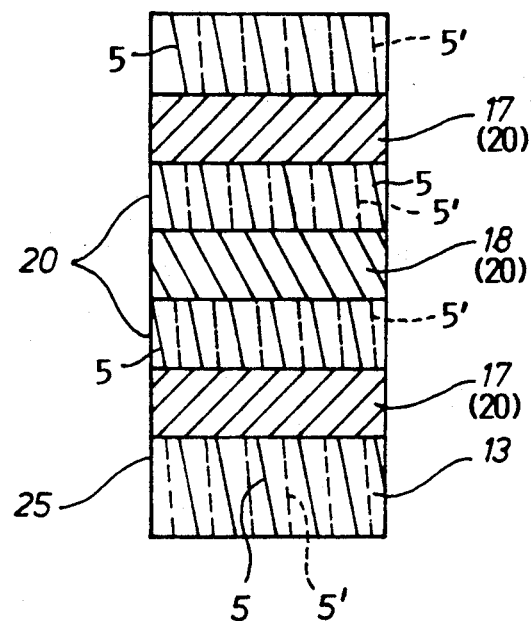
FIG. 9 is a horizontal sectional view through the closed die which is shown in an open condition in FIG. 6, to illustrate the reorientation of the fibers by the closing pressure of the die.

Referring to FIGS. 8 and 9, the displacement or reorientation of the fiber orientation will now be described. Such displacement or reorientation is caused by the pressing operation which operation is described above with reference to FIG. 6. The prepreg 4 has an initial fiber orientation 5 shown in full lines, whereby a first crossing angle between the fiber orientation 5 and a length direction of the prepreg 4 is formed. After the pressing a new fiber orientation 5' shown in dashed lines results because the fibers rather than being stretched, have reoriented themselves under the applied pressure by an angular change A'. Thus, the new fiber orientation 5' and the length direction enclose a smaller second crossing angle after the pressing. The fiber displacement is uniform throughout the toothed rack and such displacement according to the invention is preferable to the stretching of the fibers because it has been found that the reoriented fibers do not diminish the mechanical characteristics such as strength and wear and tear resistance of the toothed rack as compared to stretched fibers. Thus, although the plate 13 itself is somewhat stretched as it is being pressed in the die, even to the extent that its thickness is reduced, the fibers themselves are not stretched, which is an advantageous feature of the invention. Further, the length of the individual fibers indicated at 22 does not change as a result of the shaping of the toothed rack. Accordingly, the fibers will not rip even if the plate 13 is somewhat stretched. It has been found that the angular change A' of the fiber orientation permits such a stretching or lengthening of the plate 13 without actually lengthening the individual fibers which may be relatively short.

FIG. 9 shows the horizontal section through the closed die of FIG. 6, whereby the teeth 20' of one die 17 reach into the spaces 20 of the other die 18 and vice versa. The plate 13 is thus clamped between the tools 17 and 18. As the clamping pressure increases, the fiber orientation 5, shown in full lines, changes to the fiber orientation 5' shown in dashed lines. Although the matrix material of the plate 13 is being stretched, the fibers themselves are not stretched, but merely reoriented so that any overall lengthening that may be required for deforming the plate 13 into the toothed rack shape, can be accommodated by the angular change in the fiber direction. It will be noted that the dashed lines 5' extend almost in parallel to the lateral edges 25 of the toothed rack. Since the fibers 5, 5' are not stretched, the mechanical characteristics are substantially improved as mentioned above, especially with regard to the strength and wear and tear resistance, particularly along the tooth flanks.

Figure 10:
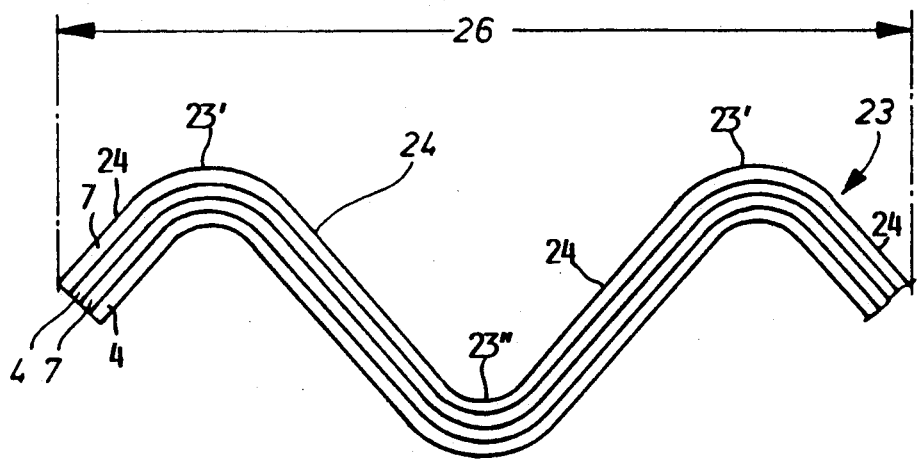
FIG. 10 is an enlarged, somewhat schematic side view of a portion of a toothed rack according to the invention, to show the deformation caused by the closing of the die of FIG. 6.

FIG. 10 shows, on an enlarged scale, a teeth profile 23 formed in a tool similar to that shown in FIG. 6, but having rounded teeth and valleys so that the teeth crowns 23' and the valleys 23" as shown in FIG. 10 are also rounded. The shifting of the fiber orientation as described above, especially with reference to FIGS. 8 and 9, from an initial orientation as shown at 5 to an orientation subsequent to the deformation and pressing as shown at 5' has the beneficial result, that at least along the tooth flanks 24 and along the lateral edges 25 of the toothed rack, the fibers extend substantially in parallel to one another and in parallel to the surface of the tooth flanks 24. The size of the shifting as indicated by the angle A' in FIG. 8 depends on such factors as the type of teeth profile in the tools, the viscosity of the matrix material, the thickness of the stack, and on the size of the initial angles 8, 9. For example, if the initial angle is 15°, the shift may take up substantially the entire 15° so that after the deformation by pressing the angle of the fiber orientation approaches zero, whereby the orientation 5' would be approximately in parallel to the surfaces of the tooth flanks 24 and the edges 25. However, it is not necessary to achieve such parallelism. A certain remaining overlap of the fiber orientation of one layer in the stack with the fiber orientation in the next neighboring layer is beneficial for the overall strength of the toothed rack.

Another advantage of the fiber orientation shifting according to the invention is seen in that the shrinking of the prepregs due to the curing is minimized. In other words, the shrinking of the overall length 26 of the toothed rack shown symbolically in FIG. 10 is minimal.

Figure 11:
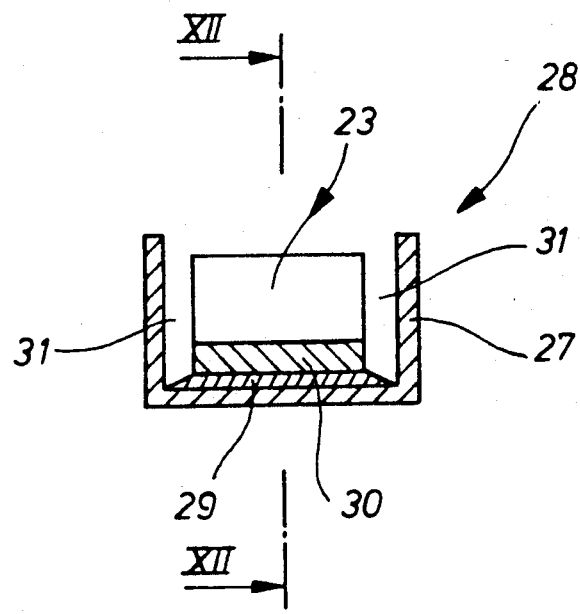
FIG. 11 is a sectional view along section line XI—XI in FIG. 12, to illustrate the combination of the present toothed rack with a reinforcing channel member having a U-shaped cross-section.

FIG. 11 shows another way of strengthening the stiffness and torsion resistance of a toothed rack according to the invention by means of a reinforcing channel member 27 having a U-cross-section. The channel 27 is also made of a synthetic material, for example, by extrusion pressing or drawing or in a molding operation. The material for the member 27 does not need to be a synthetic material. Metals are suitable as well, for example extruded aluminum sections, since the material of the reinforcing member 27 is not exposed to the wear and tear which is taken up by the tooth flanks. The material of the member 27 must have the required stiffness to provide the desired mechanical stability of the finished gripper rod, especially against torque loads.

Figure 12:
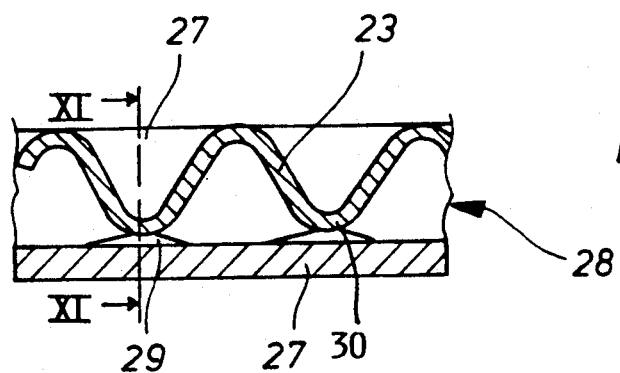
FIG. 12 is a sectional view along section line XII—XII in FIG. 11.

FIGS. 11 and 12 show that the toothed rack 23 is secured to the reinforcing member 27 by adhesive bonding areas 29 and 31. The downwardly facing ridges 30 of the toothed racks are secured to the floor of the member 27 by a bonding adhesive shown at 29.

The lateral edges of the toothed rack 23 are secured to the lateral walls of the member 27 by an adhesive shown at 31. Instead of an adhesive bonding, welding could be employed or even a press-fit may be satisfactory.

Rather than using individual fibers as the reinforcing material in the fiber composite prepregs, it is possible to use fiber fabrics having weft and warp threads. It is also possible to use knitted fabrics as the reinforcing fiber material. The knitted fabrics will have ribs of fibers extending in the above mentioned orientations. The orientation of the fibers in a fiber fabric relative to each other is not important to the invention.

Figure 13:
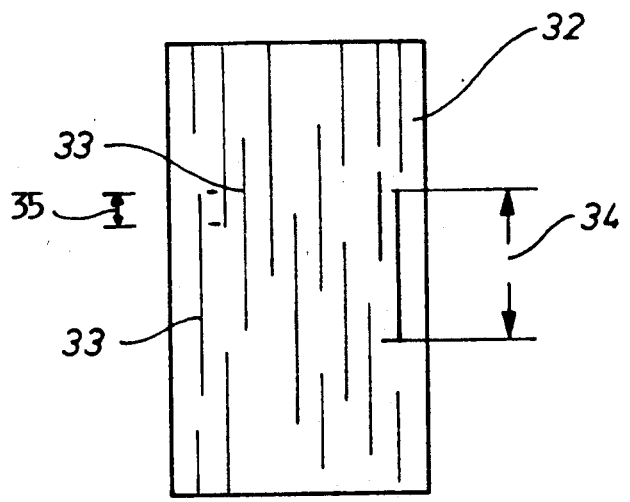
FIG. 13 is a top plan view of another type of prepreg that may also be used for making toothed racks according to the invention.

FIG. 13 illustrates an embodiment in which a prepreg 32 comprises relatively short reinforcing fibers 33 having an average length 34 within the range of about 30 mm to about 40 mm. The fibers 33 are distributed randomly in the longitudinal direction, but extend initially substantially in parallel to each other in the longitudinal direction, but with overlaps in the crosswise direction. When a prepreg 32 is used for making the present toothed racks, the pressing in the die as shown in FIG. 6, does not cause an angular shifting of the fiber orientation. Rather, the extent of overlap is somewhat reduced as a result of the deformation in the die. However, after the pressing the fibers 33 still run substantially in parallel to the surfaces forming the teeth flanks 24 and the edges 25.

The above mentioned preliminary curing of the plate 13 may not be necessary at all. For example, it is possible to insert the stack of still uncured prepregs directly into the tool and cause the curing during and after the deformation. In such a case, thermosetting materials may be suitable for use as matrix materials.

Although the invention has been described with reference to specific example embodiments, it will be appreciated that it is intended to cover all modifications and equivalents within the scope of the appended claims.

What we claim is:

1. A gripper rod for a shuttleless loom, comprising a corrugated stack of fiber composite layers forming a toothed rack, each layer including reinforcing fibers embedded in a matrix material cured for bonding said layers to one another, said fibers having such an orientation in each layer, at least prior to said bonding and prior to any compressing of said layers for forming said stack, that the fibers in any layer extend in a direction that crosses the fiber direction in at least one directly neighboring layer at a crossing angle, and wherein said crossing angle is changed by said compressing without stretching said fibers by said compressing.

2. The gripper rod of claim 1, wherein said crossing angle between fibers in directly neighboring layers is within the range of 15° to 25° prior to said compressing, said crossing angle becoming smaller during said compressing, and wherein said fibers extend uninterrupted in the respective layer at least where corrugations of said stack form tooth flanks of said toothed rack of said gripper rod, whereby exposed fiber ends are avoided at least along said tooth flanks.

3. The gripper rod of claim 1, wherein said corrugated stack comprises a corrugated central plane of symmetry, a first set of fiber composite layers on one side of said plane of symmetry, a second set of fiber composite layers on the opposite side of said plane of symmetry, said first and second set of fiber composite layers being arranged in mirror-symmetrical fashion relative to said plane of symmetry.

4. The gripper rod of claim 3, comprising two inner fiber composite layers one in each set, said inner layers being bonded to each other along said central plane of symmetry, both inner layers having the same fiber orientation, and wherein further fiber composite layers in each set have alternately opposite fiber orientations in neighboring layers.

5. The gripper rod of claim 3, wherein said plane of symmetry is formed by a central fiber composite layer having a given fiber orientation, wherein two fiber composite layers bonded to opposite sides of said central layer have fiber orientations opposite to said given fiber orientation in said central fiber composite layer, and wherein further fiber layers have fiber orientations that alternate from layer to layer.

6. The gripper rod of claim 1, wherein said fiber composite layers are stacked in a mirror-symmetrical arrangement relative to a central plane, wherein said fiber composite layers comprise two sets of layers, one set having fibers oriented at an angle of −15° or +15° relative to a longitudinal edge of the respective layer, the other set having fibers oriented at an angle within the range of 30° to 45° relative to a longitudinal edge of the respective layer, and wherein layers from one set alternate with layers from the other set to form said mirror-symmetrical arrangement.

7. The gripper rod of claim 1, further comprising a reinforcing channel member having a U-cross-section, and means securing said corrugated stack of fiber composite layers in said reinforcing channel.

8. The gripper rod of claim 7, wherein said U-cross-section has an internal width larger than a finished width of said corrugated stack for providing a bonding gap between lateral edges of said corrugated stack and inner surfaces of said channel member, and bonding means securing said lateral edges to said channel member, said bonding means being located in said gap.

9. The gripper rod of claim 1, wherein said fiber composite layers comprise a fiber fabric having warp threads and weft threads, and wherein said fiber orientation relates to said warp threads.

10. The gripper rod of claim 1, wherein said fiber composite layers comprise a knit fiber fabric with a three-dimensional fiber structure having a fiber structure direction corresponding to said fiber orientation.

11. The gripper rod of claim 1, further comprising a reinforcing flat stiffening bar and means securing said corrugated stack to said stiffening bar whereby said stiffening bar increases the torsion stiffness of said gripper rod.

12. A gripper rod for a shuttleless loom, comprising a corrugated stack of fiber composite layers, each layer including reinforcing fibers embedded in a matrix material cured for bonding said layers to one another, said fibers having a length within the range of about 30 mm to about 40 mm, said fibers extending alongside to each other in a random distribution in a lengthwise direction, so that neighboring fibers are oriented in a staggered relationship in a lengthwise direction so that neighboring fibers overlap in a crosswise direction.

13. The gripper rod of claim 12, wherein said fibers extend in said matrix material substantially in parallel to a surface of said corrugated stack.

14. A method for producing a gripper rod for a shuttleless loom comprising the following steps:
(a) preparing a plurality of fiber composite prepreg layers having reinforcing fibers embedded in matrix material so that individual fibers in each layer extend at an angle relative to a longitudinal edge of each prepreg layer,
(b) stacking said plurality of prepreg layers to form a stack, so that the fibers in any prepreg layer in said stack cross a longitudinal direction at a first crossing angle,
(c) inserting said stack into a die having an upper tool and a lower tool, each tool having a toothed rack configuration arranged so that teeth in one tool face gaps between teeth in the other tool,
(d) pressing said tools against each other so that said stack is compressed between the tools to assume a corrugated toothed rack configuration and so that said first crossing angle changes as a result of and during said pressing into a second crossing angle which is smaller than said first crossing angle,
(e) curing said matrix material, thereby bonding said layers to each other in said corrugated toothed rack configuration in which fibers have said second crossing angle,
(f) removing the cured stack from said die, and
(g) securing said corrugated configuration to a support member to form said gripper rod.

15. The method of claim 14, wherein said stacking is performed so that two different fiber orientations alternate with each other from layer to layer in said stack.

16. The method of claim 14, wherein said stacking is performed with reference to a central plane of symmetry and so that two fiber orientations alternate with each other from layer to layer in said stack and with a mirror-symmetrical distribution relative to said central plane.

17. The method of claim 14, comprising heating said stack to perform said curing.

18. The method of claim 14, comprising selecting a thermoplastic material for said matrix material and softening said thermoplastic matrix material by heating prior to said pressing, and then again cooling said thermoplastic material to form said toothed rack.

19. The method of claim 14, wherein said pressing makes said crossing angle smaller without stretching said fibers.

20. The method of claim 14, wherein a preliminary curing is performed prior to said inserting step.

* * * * *